(12) United States Patent
Fujishiro (10) Patent No.: US 6,667,567 B2
(45) Date of Patent: Dec. 23, 2003

(54) LIGHT SOURCE UNIT

(75) Inventor: Fumihiko Fujishiro, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 243 days.

(21) Appl. No.: 09/808,007

(22) Filed: Mar. 15, 2001

(65) Prior Publication Data

US 2001/0022494 A1 Sep. 20, 2001

(30) Foreign Application Priority Data

Mar. 15, 2000 (JP) ........................................ 2000-073039

(51) Int. Cl.[7] .............................. H01J 1/02; H01J 61/52; H01J 7/24; H01K 1/58; G02F 1/1333
(52) U.S. Cl. ................................ 313/46; 313/45; 313/40; 313/26; 313/13; 349/161
(58) Field of Search ........................... 313/13, 19, 20, 313/26, 28, 40, 45, 46, 484; 349/161

(56) References Cited

U.S. PATENT DOCUMENTS 4,562,376 A * 12/1985 Koizumi ...................... 313/34
5,146,354 A * 9/1992 Plesinger ..................... 349/59
5,299,038 A * 3/1994 Hamada et al. ............. 349/161

FOREIGN PATENT DOCUMENTS

| JP | 10-172512 | * | 6/1998 |
| JP | A 11-295683 | | 10/1999 |
| KR | 1999-029517 | | 4/1999 |

* cited by examiner

Primary Examiner—Matt Hodges
(74) Attorney, Agent, or Firm—Young & Thompson

(57) ABSTRACT

A light source unit includes (a) a light source having a main surface through which a light emitted from the light source passes towards an object, (b) a light-permeable substrate located between the main surface of the light source and the object, (c) a first seal sandwiched between the main surface of the light source and a surface of the light-permeable substrate and defining a first closed space together with the main surface and the surface of the light-permeable substrate, the first closed space being in vacuum, and (d) a heat radiator equipped with the light source for outwardly radiating heat generated in the light source.

19 Claims, 9 Drawing Sheets

LIGHT SOURCE UNIT

BACKGROUND OF THE INVENTION

1. Field of the Invention

The invention relates to a light source unit, and more particularly to a light source unit which is capable of preventing temperature increase therein.

2. Description of the Related Art

As a liquid crystal display device has been fabricated in a larger size, a liquid crystal display device is required to have a higher brightness and a wider view angle.

In order to accomplish a higher brightness in a liquid crystal display device, transmissivity of a liquid crystal panel and an efficiency at which a light is used have been improved. However, there is a limitation in such ways, and hence, a brightness in a light source unit is presently tried to increase.

A wider view angle in a liquid crystal display device is often accompanied with a demerit that a transmissivity of a liquid crystal panel is deteriorated. In order to compensate for such a demerit, a brightness in a light source unit is required to increase.

That is, a higher brightness in a light source unit would accomplish a higher brightness and a wider view angle in a liquid crystal display device.

However, it would be necessary to supply an increased power to a light source unit in order to accomplish a higher brightness in a light source unit. It is well known that about 10 to 40% of an energy emitted from a light source unit is lost as heat radiation. That is, as an increasing power is supplied to a light source, heat generated in the light source increases, and heat loss also increases.

If a light source increasingly generates heat, a liquid crystal panel positioned in the vicinity of the light source would be heated accordingly, resulting in that display quality in the liquid crystal panel would be degraded because the liquid crystal panel has a display characteristic which is influenced by heat.

Thus, there has been a demand for a liquid crystal display device which is capable of accomplishing a higher brightness without degradation in display quality.

As a solution to the above-mentioned problem, a shield in which a liquid crystal display device is housed has been equipped with a fun or a heat sink.

Hereinbelow is explained conventional light source units used in a liquid crystal display device.

Figure 1A:
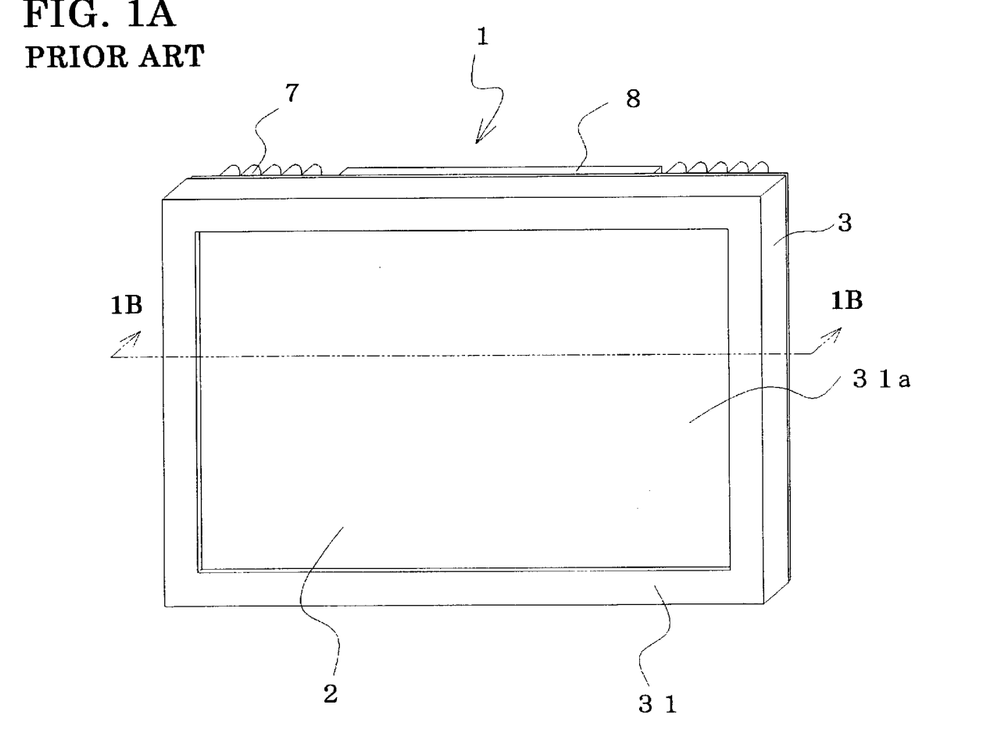
FIG. 1A is a perspective view of a conventional liquid crystal display device.
Figure 1B:
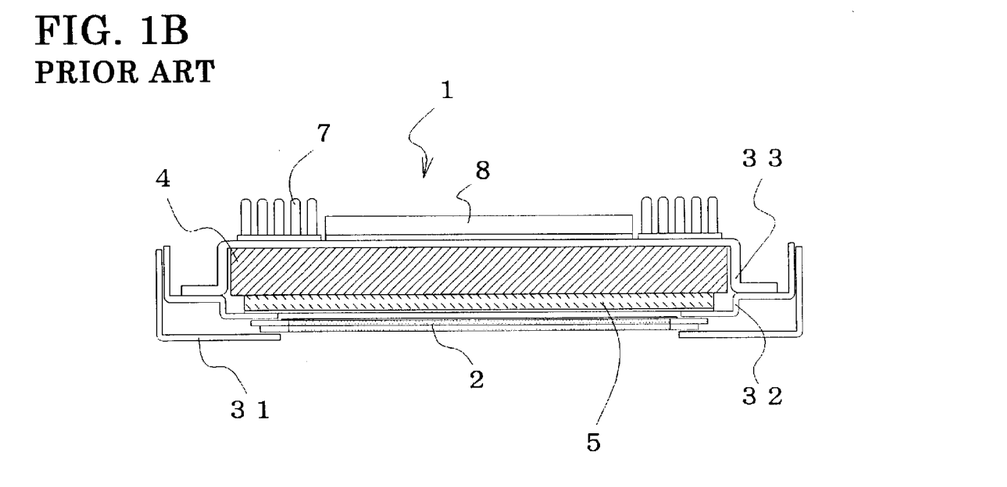
FIG. 1B is a cross-sectional view taken along the line 1B—1B in FIG. 1.

FIG. 1A is a perspective view of a conventional liquid crystal display device, and FIG. 1B is a cross-sectional view taken along the line 1B—1B in FIG. 1A.

The illustrated liquid crystal display device 1 is comprised of a liquid crystal panel 2, a shield 3 in which the liquid crystal panel 2 and a light source unit 4 (see FIG. 1B) are accommodated, a heat radiator 7 formed on a rear surface of the shield 3, and parts 8 mounted on a rear surface of the shield 3.

A shield front 31a defining a front surface of the shield 31 is formed with an opening 31a through which a part of the liquid crystal panel 2 is exposed. A exposed portion of the liquid crystal panel 2 defines a display screen of the liquid crystal display device 1.

As illustrated in FIG. 1B, the heat radiator 7 is mounted on a shield rear 33 defining a rear surface of the shield 3. The shield rear 33 is composed of metal having high thermal conductivity and being light, such as aluminum.

Heat generated in the light source unit 4 is radiated through the shield rear 33 having high heat radiation property.

As illustrated in FIG. 1B, the liquid crystal display device 1 includes the liquid crystal panel 2 in the form of a plate, a light-diffusion plate 5, and the light source unit 4. They are arranged in parallel with one another in facing relation to one another.

The liquid crystal panel 2 is supported by being sandwiched between the shield front 31 and a shield center 32. The light-diffusion plate 5 and the light source unit 4 are supported by being sandwiched between the shield center 32 and the shield rear 33.

The heat radiator 7 and the parts 8 are mounted on a rear surface of the shield rear 33.

The shield front 31, the shield center 32 and the shield rear 33 are coupled to one another through screws.

Hereinbelow is explained a structure of the light source unit 4. A structure of the light source unit 4 is grouped into a beneath-arrangement type and a side light type.

Figure 2A:
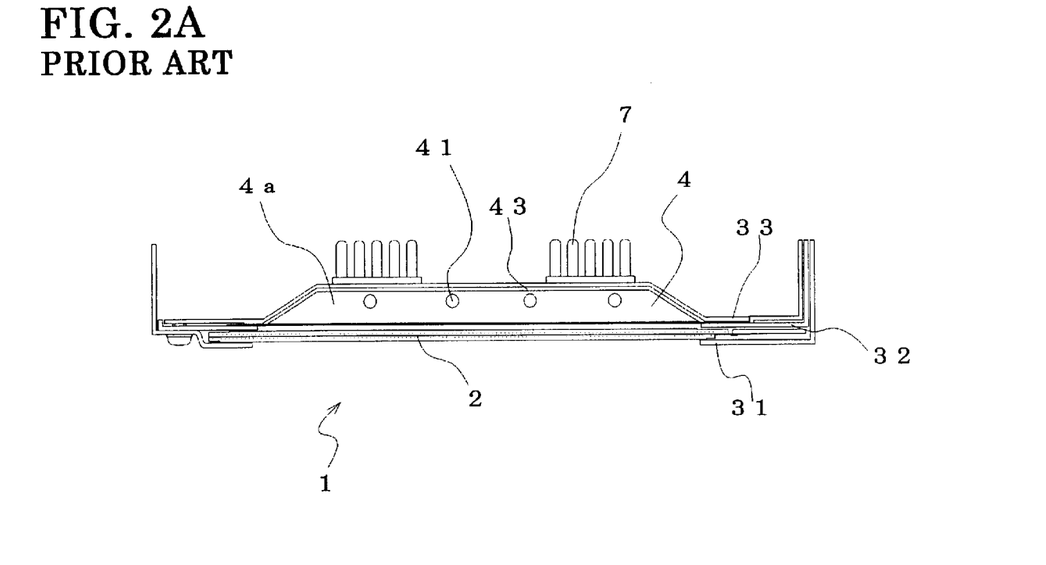
FIG. 2A is a cross-sectional view of another conventional liquid crystal display device.
Figure 2B:
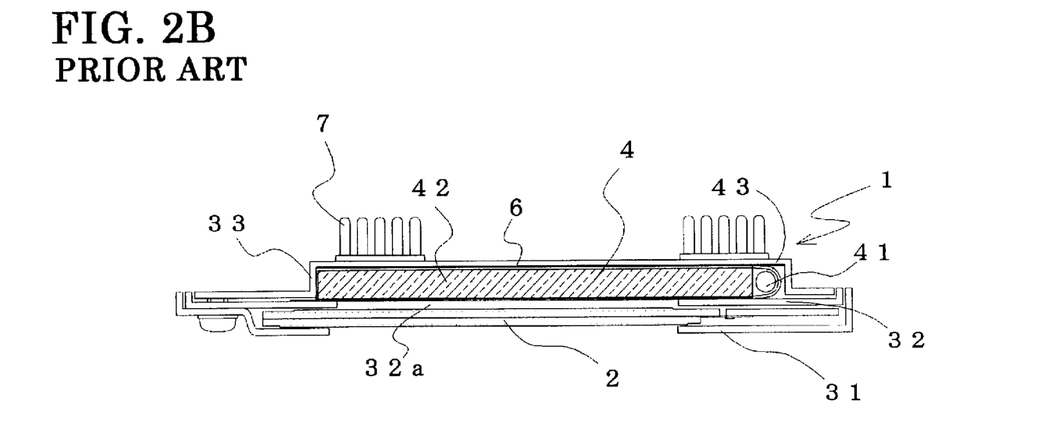
FIG. 2B is a cross-sectional view of still another conventional liquid crystal display device.

FIG. 2A is a cross-sectional view of a liquid crystal display device including a beneath-arrangement type light source unit, and FIG. 2B is a cross-sectional view of a liquid crystal display device including a side light type light source unit.

As illustrated in FIG. 2A, a beneath-arrangement type light source unit 4 is comprised of a reflector 43 positioned in a dish-shaped portion 4a (lamp house) of the shield rear 33, a plurality of pillar-shaped light sources 41 near and along the reflector 43, and a light-diffusion plate (not illustrated) covering the lamp house 4a and spaced away from the light sources 41.

The light-diffusion plate prevents non-uniformity in brightness.

As illustrated in FIG. 2B, a side light type light source unit 4 is comprised of a light-guide plate 42 in the form of a plate, a pillar-shaped light source 41 located adjacent to a side of the light-guide plate 42, and a reflector 43 surrounding the light source 41.

The light-guide plate 42 is composed of highly light-permeable acrylic plate. A light emitted from the light source 41 passes through the light-guide plate 42, and illuminates a rear surface of the liquid crystal panel 2 through an opening 32a formed with the shield center 32.

Dots are printed over a rear surface of the light-guide plate 42 facing the shield rear 33 in order to prevent non-uniformity in brightness.

Japanese Unexamined Patent Publication No. 10-172512 has suggested a light source unit which prevents an increase in temperature in an object to which a light is to be radiated.

Figure 3:
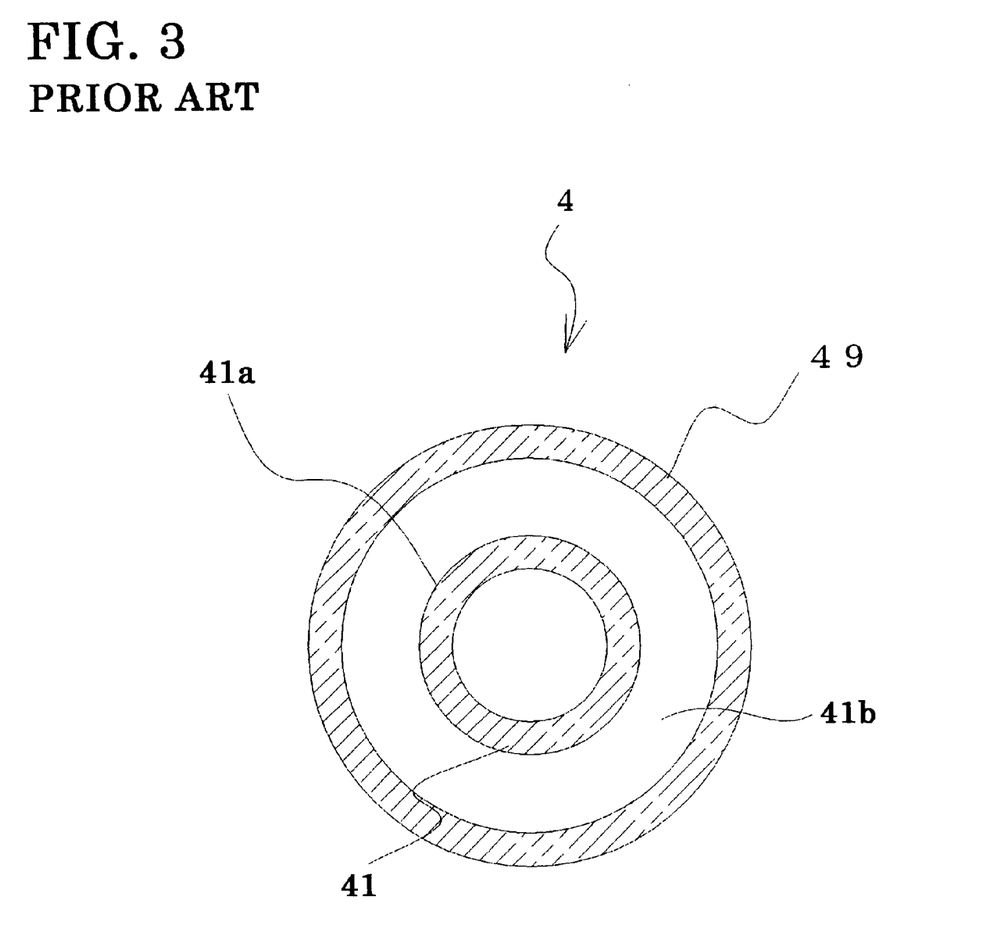
FIG. 3 is a cross-sectional view of yet another conventional liquid crystal display device.

As illustrated in FIG. 3, the suggested light source unit 4 includes a light source 41 comprised of an elongate glass bulb containing an electrically discharging medium, and an outer glass pipe 49 spaced away from the light source 41 to thereby define a vacuum layer 41b therebetween. A light emitted from the light source 41 passes through an entire surface 41a of the glass bulb 41, and heat radiated from the light source 41 through the entire surface 41a is absorbed in the vacuum layer 41b. Thus, it would be possible to reduce heat radiation to an object which is to be illuminated by the light source 41.

As mentioned earlier, if a brightness at a display surface of a liquid crystal display device is to be increased, heat radiation to a liquid crystal panel from a light source unit would be increased in dependence on an increase in the brightness.

Hence, the heat radiation has to be suppressed in order not to deteriorate a brightness and a display quality of a liquid crystal panel.

However, the conventional liquid crystal display device including a heat radiator mounted on a rear surface of a shield could be improved only in that the shield and/or heat radiator are(is) composed of material having high thermal conductivity, or that the heat radiator is designed to have a surface area as wide as possible.

In accordance with the light source unit suggested in the above-mentioned Japanese Unexamined Patent Publication No. 10-172512, interruption of heat to an object (liquid crystal panel) from the light source unit could be obtained to some degree. However, only such adiabatic effect could accomplish just a limited increase in output power of the light source unit.

Specifically, if an output power of the light source unit is increased, a temperature in the glass bulb 41 would be raised more than necessary due to heat interruption from an atmosphere, resulting in reduction in a light-emitting efficiency and reduction in a lifetime caused by degradation of phosphor and/or electrodes.

If the above-mentioned light source unit is applied to a side light type light source unit, multiple reflection would occur to the reflector 43, resulting in light loss.

In addition, since the outer glass pipe 49 does not have a light diffusion function, a light diffusion plate has to be newly added to the light source unit, causing a problem that the light source unit unavoidably becomes larger in size.

SUMMARY OF THE INVENTION

In view of the above-mentioned problems in the conventional light source units, it is an object of the present invention to provide a light source unit which is capable of preventing heat accumulation in an object to which a light is radiated.

In one aspect of the present invention, there is provided a light source unit including (a) a light source having a main surface through which a light emitted from the light source passes towards an object, (b) a light-permeable substrate located between the main surface of the light source and the object, (c) a first seal sandwiched between the main surface of the light source and a surface of the light-permeable substrate and defining a first closed space together with the main surface and the surface of the light-permeable substrate, the first closed space being in vacuum, and (d) a heat radiator equipped with the light source for outwardly radiating heat generated in the light source.

For instance, the light source may includes (a) a first substrate, (b) a second substrate, (c) a second seal sandwiched between the first and second substrates and defining a second closed space together with the first and second substrates, noble gas being sealed in the second closed space.

As an alternative, the light source may includes (a) a first substrate facing the light-permeable substrate, (b) a second substrate, (c) a third substrate, (d) a second seal sandwiched between the first and second substrates and defining a second closed space together with the first and second substrates, noble gas being sealed in the second closed space, (e) a third seal sandwiched between the second and third substrates and defining a third closed space together with the second and third substrates, the third seal being formed with a first through-hole through which heat accumulated in the third closed space passes outwardly of the third closed space.

The light source unit may further include a shield covering the light source therewith, the shield being formed with a second through-hole which is in communication with the first through-hole.

The light source unit may further include a dish-shaped shield in which the light source is set and which defines a closed space together with the light-permeable substrate.

The light source unit may further include a shield, and a light-guide plate located in the shield, and having a first surface through which a light emitted from the light source passes, and a second surface of which the light source is positioned in the vicinity.

It is preferable that the dish-shaped shield is formed with at least one through-hole through which heat generated in the light source is radiated.

It is preferable that the shield is formed with at least one through-hole through which heat generated in the light source is radiated.

It is preferable that the first closed space is kept in a pressure equal to or smaller than $1.33 \times 10^3$ Pa.

It is preferable that the light-permeable substrate has a function of diffusing a light emitted from the light source.

In another aspect of the present invention, there is provided a method of fabricating a light source unit, including the steps of (a) forming at least one electrode on a first surface of a first substrate, (b) forming a first dielectric layer on the first surface such that the electrode is covered with the first dielectric layer, (c) forming a second dielectric layer on a first surface of a second substrate, (d) forming a phosphor layer on the second dielectric layer, (e) facing the first substrate, the second substrate and a third substrate one another with a spacer being sandwiched between any two substrates among the first to third substrates such that the phosphor layer of the second substrate faces the dielectric layer of the first substrate and that the third substrate is adjacent to the second substrate, (f) making a first closed space vacuous which first closed space is defined by the first substrate, the second substrate and the spacer, (g) introducing noble gas into the first closed space, and (h) making a second closed space vacuous which second closed space is defined by the second substrate, the third substrate and the spacer.

It is preferable that the second closed space is kept in pressure equal to or smaller than $1.33 \times 10^3$ Pa in said step (h).

The method may further include the step of forming a protection layer on the first dielectric layer.

The method may further include the step of coating a glass having a low fusing point, around the first and second substrates.

The method may further include the step of applying a light diffusion function to at least one of upper and lower surfaces of the third substrate.

The method may further include the steps of forming at least one through-hole with the first substrate from which air is exhausted from the first closed space, and sealing the through-hole after air has been exhausted from the first closed space.

The method may further include the steps of forming at least one through-hole with the third substrate from which air is exhausted from the second closed space, and sealing the through-hole after air has been exhausted from the second closed space.

The method may further include the steps of forming at least one through-hole with the spacer from which air is exhausted from the first closed space, the spacer connecting the first and second substrates to each other, and sealing the through-hole after air has been exhausted from the first closed space.

The method may further include the steps of forming at least one through-hole with the spacer from which air is exhausted from the second closed space, the spacer connecting the second and third substrates to each other, and sealing the through-hole after air has been exhausted from the second closed space.

It is preferable that the first closed space is made vacuous in the step (f) by exhausting air therefrom.

It is preferable that the first closed space is made vacuous in the step (f) by carrying out the step (e) in a vacuum chamber.

It is preferable that the second closed space is made vacuous in the step (h) by exhausting air therefrom.

It is preferable that the second closed space is made vacuous in the step (h) by carrying out the step (e) in a vacuum chamber.

In still another aspect of the present invention, there is provided a liquid crystal display unit including (a) one of the above-mentioned light source unit, and (b) a liquid crystal display device receiving a light from the light source unit to display a designated image.

The advantages obtained by the aforementioned present invention will be described hereinbelow.

In accordance with the above-mentioned invention, it is possible to reduce heat radiation to an optical part such as a liquid crystal panel or a light diffusion plate from a light source unit, and to enhance an output power of a light source unit by virtue of efficient heat radiation.

This ensures that an object can be lighted with a higher brightness.

By applying the present invention to a beneath-arrangement type light source unit, a sufficient distance can be ensured between a light source and an optical part such as a light diffusion plate, ensuring reduction in non-uniformity in a brightness.

In addition, the present invention can reduce fabrication costs and the number of fabrication steps.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 4:
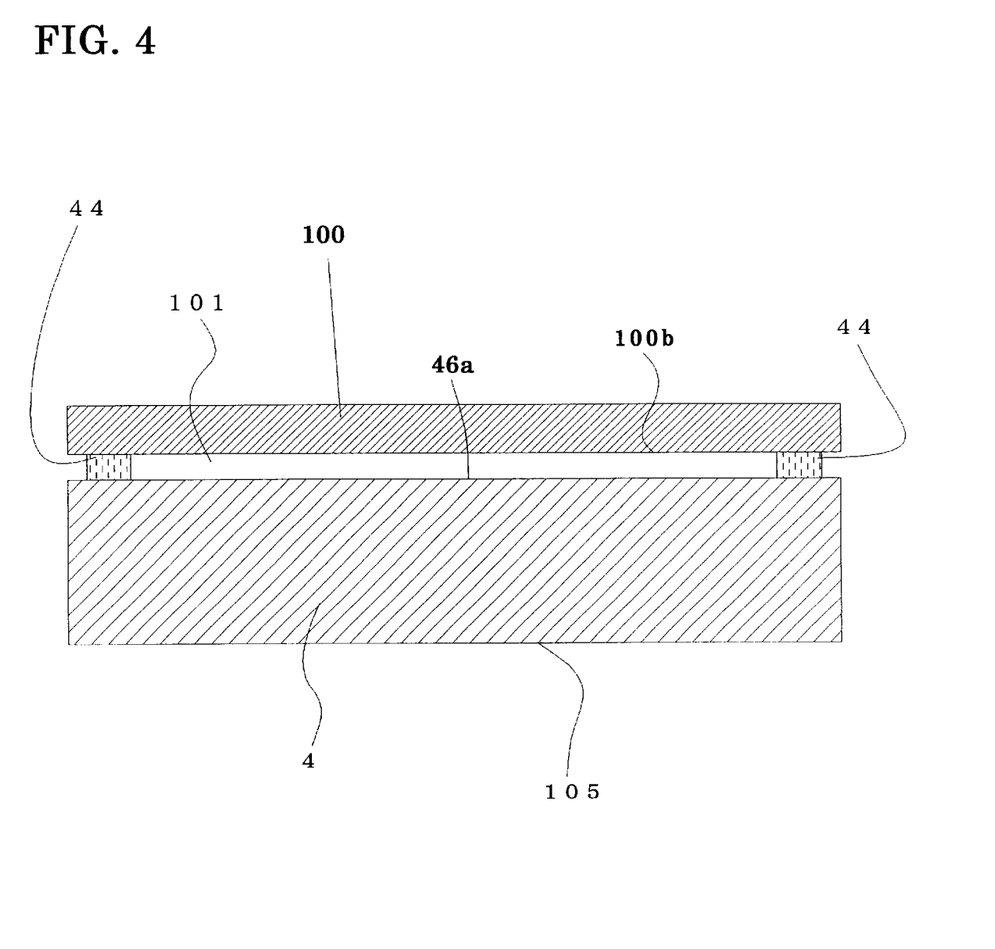
FIG. 4 is a cross-sectional view of a light source unit in accordance with an embodiment of the present invention.

FIG. 4 is a cross-sectional view of a light source unit in accordance with a preferred embodiment of the present invention.

A light source unit in accordance with the embodiment is comprised of a light source 4 having a main surface 46a through which a light emitted from the light source 4 passes towards an object (not illustrated), a light-permeable substrate 100 located between the main surface 46a of the light source 4 and the object, a first seal 44 which is sandwiched between the main surface 46a of the light source 4 and a lower surface 100b of the light-permeable substrate 100 and which defines a first closed space 101 together with the main surface 46a of the light source 4 and the lower surface 100b of the light-permeable substrate 100, a heat radiator 105 equipped with the light source 4 at a surface opposite to the main surface 46a for outwardly radiating heat generated in the light source 4, and a shield 3 (see FIG. 5) covering the light source 4 therewith.

The first closed space 101 is kept in a pressure equal to or smaller than $1.33 \times 10^3$ Pa to thereby form an adiabatic layer.

Figure 5:
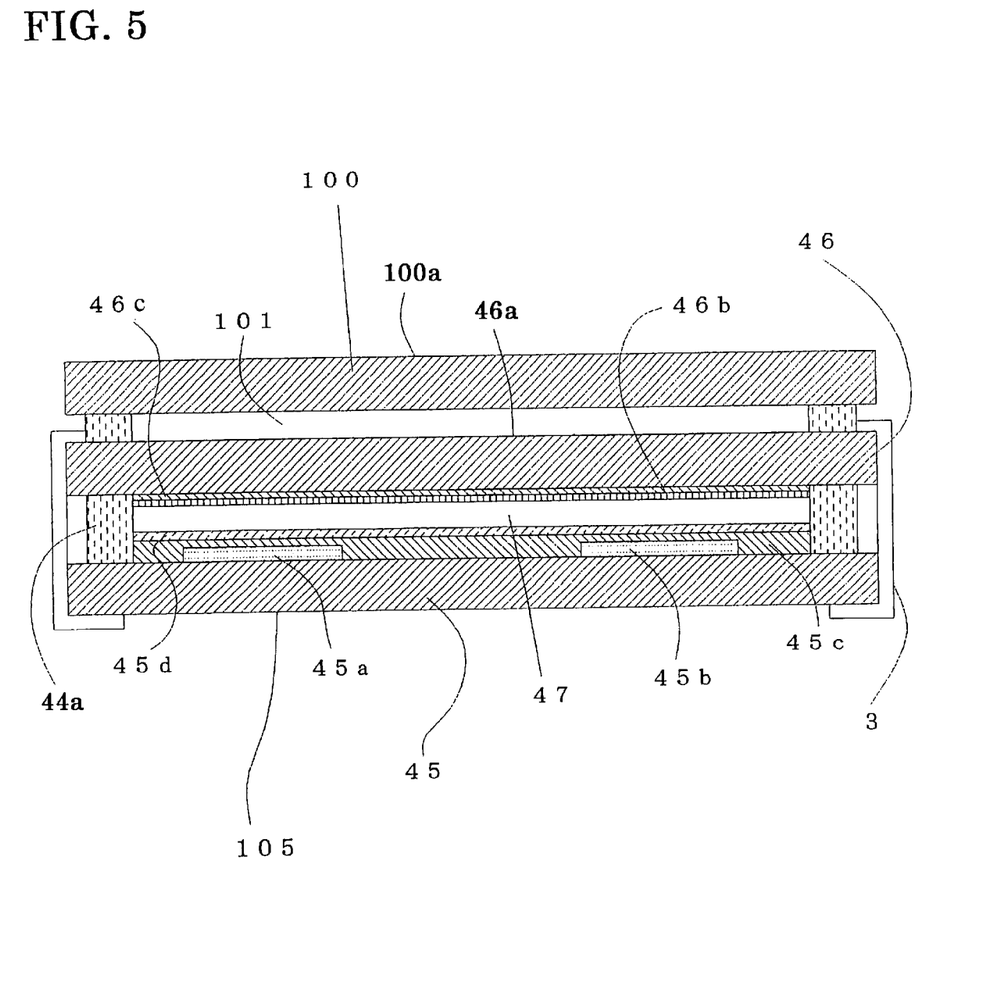
FIG. 5 is a detailed cross-sectional view of the light source unit illustrated in FIG. 4.

FIG. 5 is a cross-sectional view of the light source unit, in particular, illustrating a cross-section of the light source 4.

The light source 4 includes a first substrate 45, a second substrate 46, and a second seal 44a sandwiched between the first and second substrates 45 and 46 and defining a second closed space 47 together with the first and second substrates 45 and 46. Noble gas is sealed in the second closed space 47.

First and second electrodes 45a and 45b are formed on the first substrate 45. A dielectric layer 45c is formed over the first substrate 45 therewith such that the first and second electrodes 45a and 45b are covered therewith. A protection layer 45d is formed over the dielectric layer 45c.

A dielectric layer 46c and a phosphor layer 46b are formed on a lower surface of the second substrate such that the phosphor layer 46b faces the protection layer 45d.

By baking the first and second substrates 45 and 46 with the second seal 44a being sandwiched therebetween, the second closed space 47 acting as a discharge layer is formed between the first and second substrates 45 and 46.

By applying a current to the first and second electrodes 45a and 45b, the noble gas sealed in the second closed space 47 emits a light which passes through a main surface 46a of the second substrate 46 towards an object. That is, the second closed space or discharge layer 47 acts as a light source.

In the specification, an upper surface of a substrate means a surface located closer to an object to be lighted by the light source 4, and a lower surface of a substrate means a surface located farther away from an object. The main surface 46a is an upper surface of the second substrate 46.

An upper surface 100a of the light-permeable substrate 100 is designed to have a light-permeability to allow a light emitted from the discharge layer 47 therethrough, and a function of light diffusion for preventing non-uniformity in a brightness.

A function of light diffusion may be applied to a lower surface of the light-permeable substrate 100.

The first substrate 45 is exposed at a lower surface thereof to an atmosphere. Hence, heat generated in the light source 4 is radiated through a lower surface of the first substrate 45.

Figure 6:
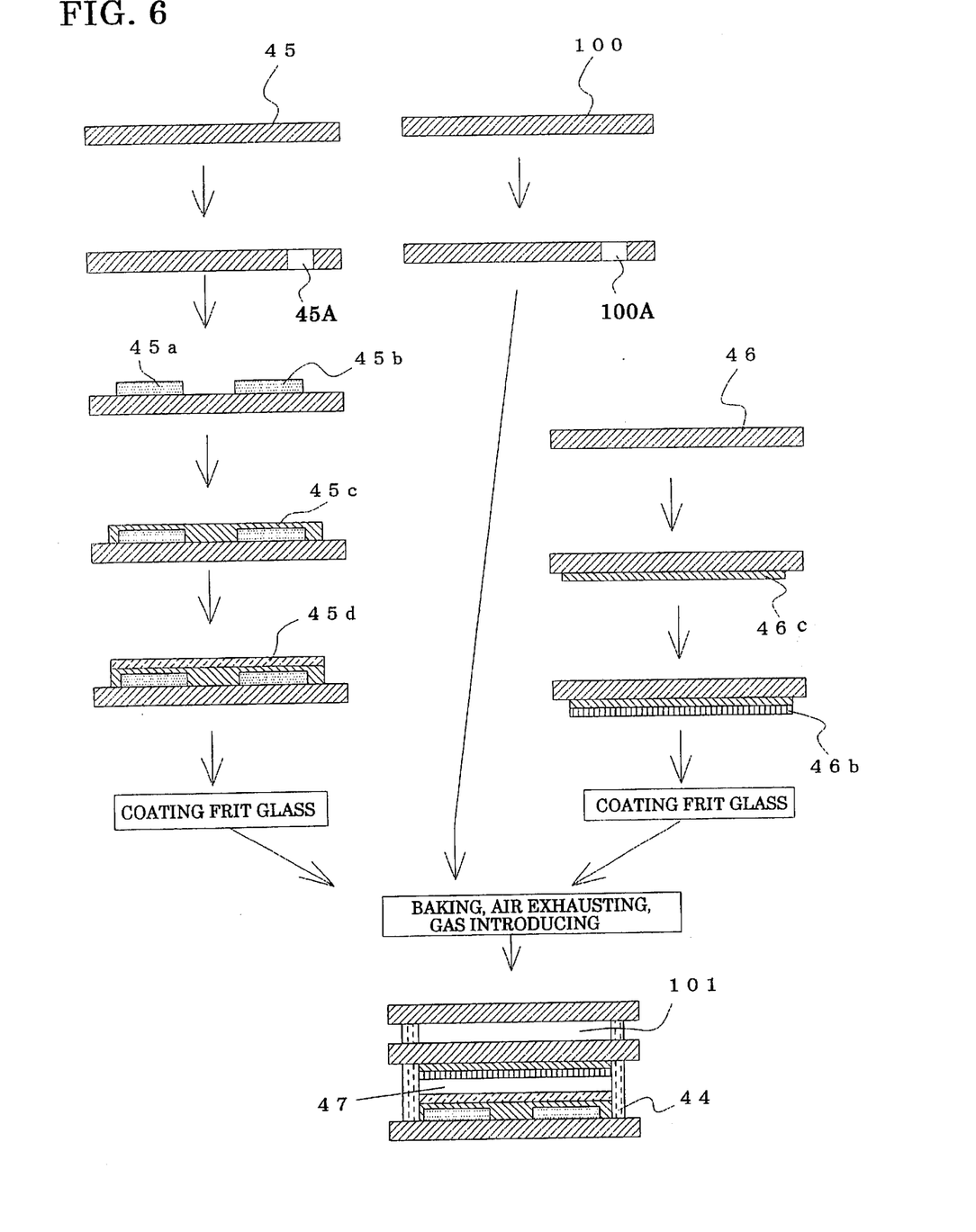
FIG. 6 is a cross-sectional view of a light source unit in accordance with an embodiment of the present invention, illustrating respective steps of a method of fabricating the same.

FIG. 6 is a cross-sectional view of the light source, illustrating respective steps of a method of fabricating the same.

As illustrated in FIG. 6, there are prepared the first substrate 45, the second substrate 46, and the light-permeable substrate 100 all of which are composed of glass.

First, the first substrate 45 is formed with a through-hole 45A.

Then, the first and second electrodes 45a and 45b are formed on an upper surface of the first substrate 45. Then, the first dielectric layer 45c is formed over an upper surface of the first substrate 45 such that the first and second electrodes 45a and 45b are covered therewith. Then, the protection layer 45d composed of MgO is formed over the first dielectric layer 45c.

Then, the second dielectric layer 46c is formed on a lower surface of a second substrate 46. Then, the phosphor layer 46b is formed on the second dielectric layer 46a.

Among the phosphor layer 46b, a blue phosphor layer is composed of a combination of $BgMgAl_{10}O_{17}$ and Eu, or $BaMg2Al_{16}O_{27}$, a green phosphor layer is composed of Tb or a combination of $LaPO_4$ and Ce, and a red phosphor layer is composed of a combination of (Y, Gd) $BO_3$ and Eu. The phosphor layer 46b is coated on second substrate 46 by dipping.

Then, a frit glass having a low melting point is coated around each of the first and second substrates 45 and 46.

Then, the light-permeable substrate 100 is formed with a through-hole 100A. If necessary, a function of light diffusion is applied to the upper surface 100a and/or a lower surface of the light-permeable substrate 100.

A light diffusion function is applied to the light-permeable substrate 100 as follows.

When the light-permeable substrate 100 is composed of glass such as soda lime glass or lead glass, sand blasting, etching or scraping may be applied to the upper and/or lower surfaces for turning glass into ground glass.

As an alternative, high polymer having an index of refraction different from an index of refraction of glass may be diffused into the light-permeable substrate 100.

When the light-permeable substrate 100 is composed of resin, sand blasting, etching or scraping may be applied to the upper and/or lower surfaces, or resin having an index of refraction different from an index of refraction of the resin of which the light-permeable substrate 100 is composed may be mixed to the light-permeable substrate 100.

Then, the light-permeable substrate 100 is coupled to the second substrate 46 with the first shield 44 being sandwiched therebetween to thereby define the first closed space 101 such that a lower surface of the light-permeable substrate 100 faces the upper surface 46a of the second substrate 46, and the first substrate 45 is coupled to the second substrate 46 with the second shield 44a being sandwiched therebetween to thereby define the second closed space 47 such that the phosphor layer 46b faces the protection layer 45d.

After the light source unit has been baked, the second closed space 47 is made vacuous by exhausting air therefrom through the through-hole 45A. Then, noble gas is introduced into the vacuous second closed space 47. Then, the through-hole 45A of the first substrate 45 is sealed. Thus, there is formed the discharge layer 47.

Then, the first closed space 101 is made vacuous by exhausting air therefrom through the through-hole 100A such that the first closed space 101 is in pressure equal to or smaller than $1.33 \times 10^3$ Pa. Then, the through-hole 100A is sealed. Thus, there is formed the vacuum or adiabatic layer 101.

Though the first substrate 45 is formed with the through-hole 45A and the light-permeable substrate 100 is formed with the through-hole 100A in the above-mentioned method, a through-hole may be formed through the first and second shields 44 and 44a.

The step of exhausting air from the first and second closed spaces 101 and 47 may be omitted by assembling the first substrate 45, the second substrate 46 and the light-permeable substrate 100 in a vacuum chamber.

Figure 7A:
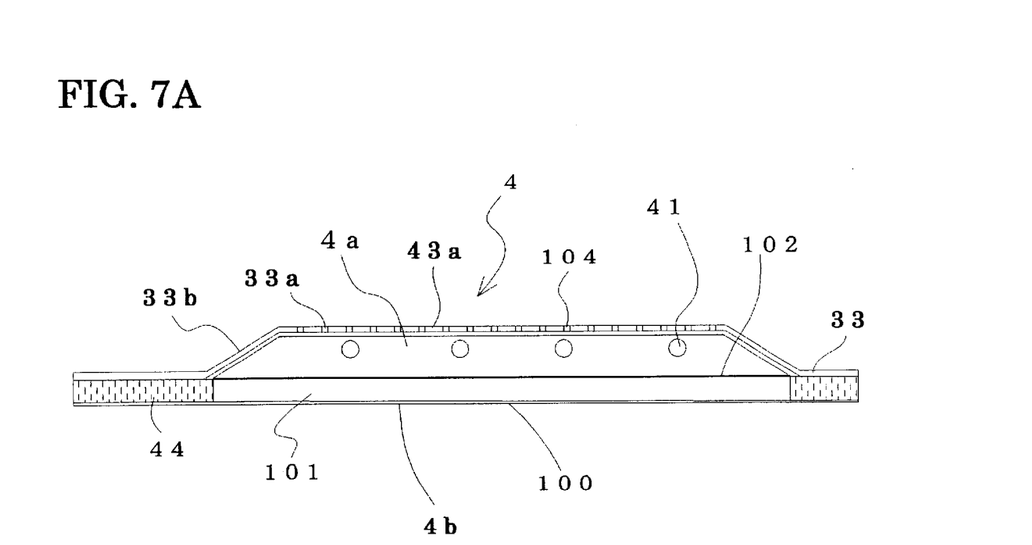
FIG. 7A is a cross-sectional view of a light source unit in accordance with another embodiment of the present invention.
Figure 7B:
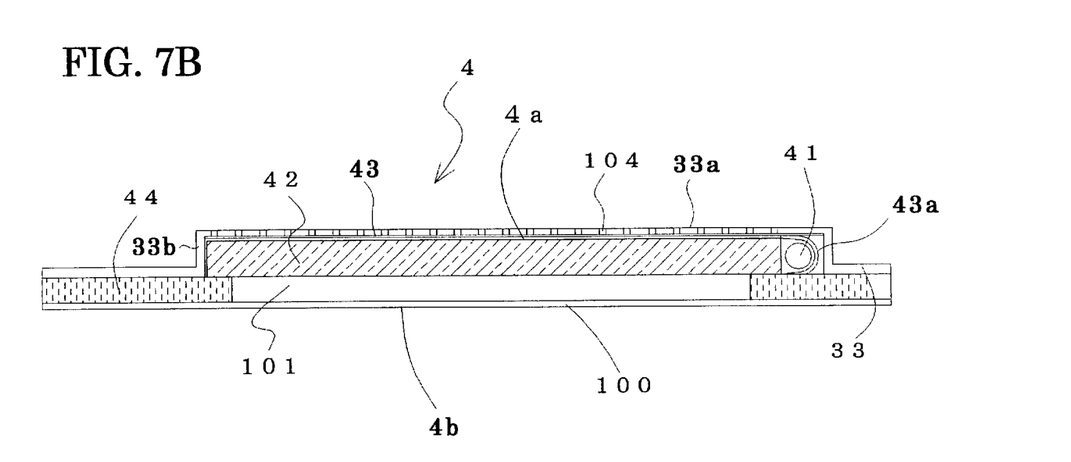
FIG. 7B is a cross-sectional view of a light source unit in accordance with still another embodiment of the present invention.

FIGS. 7A and 7B illustrate a light source unit in accordance with another embodiments of the present invention.

FIG. 7A is a cross-sectional view of a beneath-arrangement type light source unit to which the light source unit in accordance with the above-mentioned embodiment is applied. FIG. 7B is a cross-sectional view of a side light type light source unit to which the light source unit in accordance with the above-mentioned embodiment is applied.

The beneath-arrangement type light source unit illustrated in FIG. 7A includes a dish-shaped shield or lamp house 4a as a portion of the shield rear 33. In the lamp house 4a, a plurality of light sources 41 is arranged in a line. A reflector 43a surrounds the light sources 41. A light-permeable plate 102 composed of glass surrounds the lamp house 4a. Hence, there is defined a close space in the lamp house 4a by the reflector 43a and the light-permeable plate 102.

A light-permeable substrate 100 composed of glass is connected to the shield rear 33 through a shield 44 having a sealing function such that the light-permeable substrate 100 faces the light-permeable plate 102.

Thus, the light-permeable substrate 100 defines a first area 4b through which a light emitted from the light sources 41 pass and a second area covered with the shield 44.

A closed space defined by the shield 44, the light-permeable plate 102 and the light-permeable substrate 100 defines a vacuum or adiabatic layer 101 which is kept in pressure equal to or smaller than $1.33 \times 10^3$ Pa.

The vacuum or adiabatic layer 101 stops heat generated in the light sources 41, from being radiated to an object.

The shield rear 33 is formed with a plurality of through-holes 104 in the vicinity of the light sources 41. The through-holes 104 ensure that heat generated in the light sources 41 is outwardly radiated therethrough. The through-holes 104 are designed to have a function of discharging heat to such a degree that excessive heat is applied to an object, and not to deteriorate a brightness as the light source unit.

The through-holes 104 are formed preferably at a flat portion 33*a* of the shield rear 33 in the vicinity of the light sources, but may be formed at an inclined portion 33*b* of the shield rear 33 in dependence on a requirement of a heat radiation efficiency.

The side light type light source unit illustrated in FIG. 7B includes a dish-shaped portion or lamp house 4*a* as a part of the shield rear 33, a reflector 43, a light-guide plate 42, and a light source 41. The reflector 43, the light-guide plate 42 and the light source 41 are accommodated in the lamp house 4*a*.

Specifically, the reflector 43 is sandwiched between an inner surface of the lamp house 4*a* and the light-guide plate 42. The light source 41 is positioned adjacent to the light-guide plate 42, and the reflector 43 extends in a curve so that a curved portion 43*a* of the reflector 43 surrounds the light source 41.

Accordingly, a light emitted from the light source 41 is refracted in the light-guide plate 42, and leaves the light-guide plate 42 towards an object through a surface of the light-guide plate 42 facing a later mentioned light-permeable substrate 100.

A light-permeable substrate 100 composed of glass is coupled to the shield rear 33 and the light-guide plate 42 through a shield 44 around the lamp house 4*a*.

Thus, the light-permeable substrate 100 defines a first area 4*b* through which a light emitted from the light sources 41 pass and a second area covered with the shield 44.

A closed space defined by the shield 44, the light-permeable plate 42 and the light-permeable substrate 100 defines a vacuum or adiabatic layer 101 which is kept in pressure equal to or smaller than $1.33 \times 10^3$ Pa.

The vacuum or adiabatic layer 101 stops heat generated in the light sources 41, from being radiated to an object.

The shield rear 33 is formed with a plurality of through-holes 104 in the vicinity of the light sources 41. The through-holes 104 ensure that heat generated in the light sources 41 is outwardly radiated therethrough. The through-holes 104 are designed to have a function of discharging heat to such a degree that excessive heat is applied to an object, and not to deteriorate a brightness as the light source unit.

The through-holes 104 are formed preferably at a portion 33*a* of the shield rear 33 facing the light-guide plate 42 through the reflector 43, but may be formed at a side portion 33*b* of the shield rear 33 in dependence on a requirement of a heat radiation efficiency.

Figure 8A:
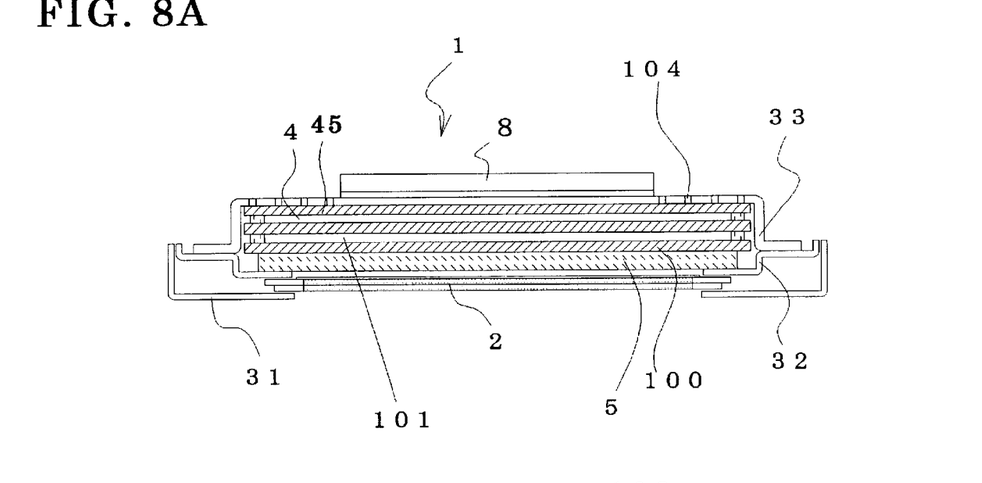
FIG. 8A is a cross-sectional view of a liquid crystal display device including the light source unit in accordance with the present invention.

FIG. 8A is a cross-sectional view of a liquid crystal display device to which the light source unit in accordance with the above-mentioned embodiment is applied.

The illustrated liquid crystal display device 1 is comprised of a light source unit 4, a light diffusion plate 5, a shield rear 33, a shield center 32 which cooperates with the shield rear 33 to support the light source unit 4 and the light diffusion plate 5 such that a light emitted from the light source unit 4 passes through an upper surface of the light diffusion plate 5, a liquid crystal panel 2, a shield front 31 which cooperates with the shield center 33 to sandwich the liquid crystal panel 2 therebetween such that the liquid crystal panel 2 faces a lower surface of the light diffusion plate 5, and parts 8 mounted on the shield rear 33.

The light source unit 4 has such a structure as illustrated in FIG. 5. The light source unit 4 is arranged such that the light-permeable substrate 100 faces the light diffusion plate 5.

The shield rear 33 is formed at an area not covered by the parts 8 with a plurality of through-holes 104. Heat generated in the light source unit 4 is radiated outwardly through the through-holes 104.

The through-holes 104 are formed preferably at a portion of the shield rear 33 facing the first substrate 45, but may be formed at a side of the shield rear 33 in dependence on a requirement of a heat radiation efficiency.

Figure 8B:
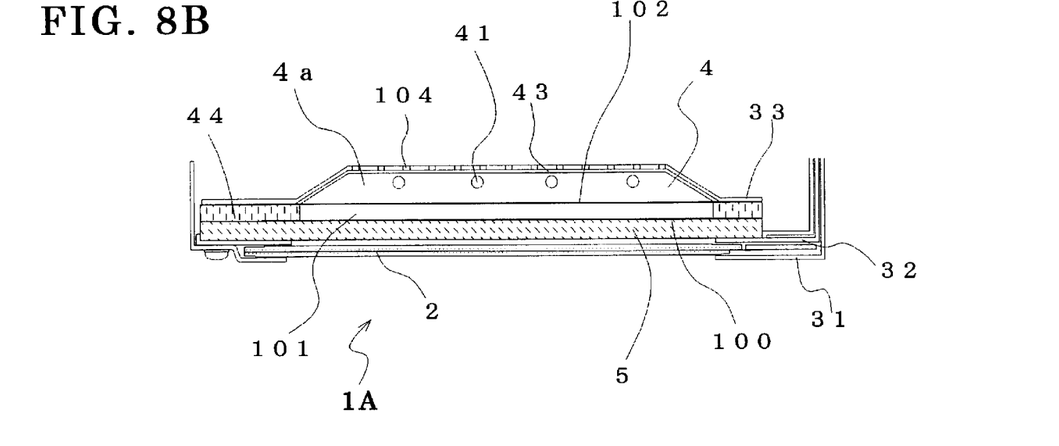
FIG. 8B is a cross-sectional view of another liquid crystal display device including the light source unit in accordance with the present invention.

FIG. 8B is a cross-sectional view of a liquid crystal display device to which the beneath-arrangement type light source unit in accordance with the above-mentioned embodiment is applied.

The illustrated liquid crystal display device 1A is comprised of the light source unit 4 illustrated in FIG. 7A, a light diffusion plate 5, a liquid crystal panel 2, a shield front 31 in the form of a frame, and a shield center 32 in the form of a frame.

The shield front 31 and the shield center 32 cooperates with each other to support the light diffusion plate 5 such that the light diffusion plate 5 faces the vacuum or adiabatic layer 101, and further support the liquid crystal panel 2 such that the liquid crystal panel 2 faces the light diffusion plate 5.

Figure 8C:
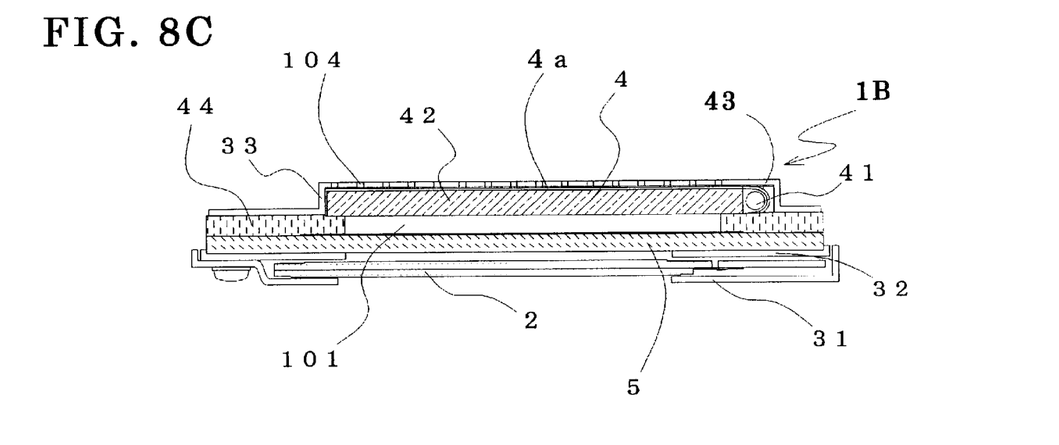
FIG. 8C is a cross-sectional view of still another liquid crystal display device including the light source unit in accordance with the present invention.

FIG. 8C is a cross-sectional view of a liquid crystal display device to which the side light type light source unit in accordance with the above-mentioned embodiment is applied.

The illustrated liquid crystal display device 1B is comprised of the light source unit 4 illustrated in FIG. 7B, a light diffusion plate 5, a liquid crystal panel 2, a shield front 31 in the form of a frame, and a shield center 32 in the form of a frame.

The shield front 31 and the shield center 32 cooperates with each other to support the light diffusion plate 5 such that the light diffusion plate 5 faces the vacuum or adiabatic layer 101, and further support the liquid crystal panel 2 such that the liquid crystal panel 2 faces the light diffusion plate 5.

Figure 9A:
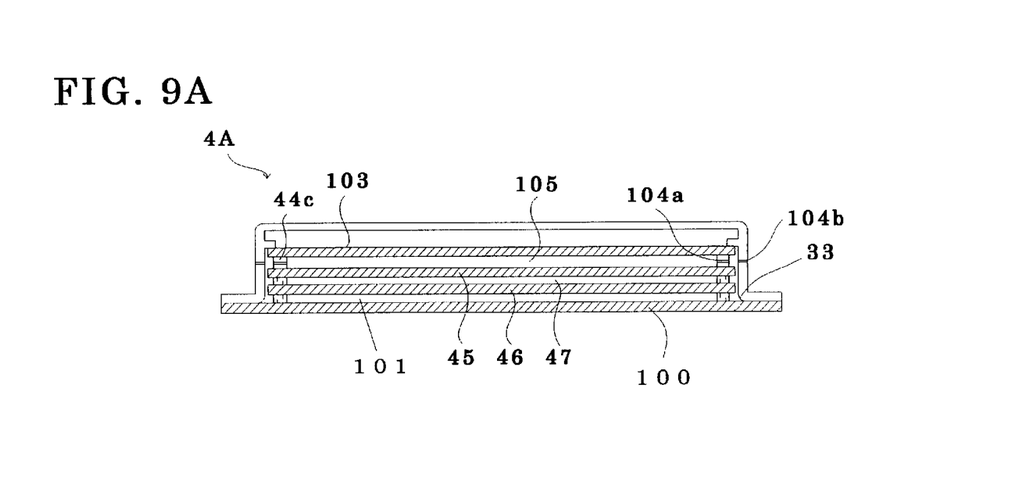
FIG. 9A is a cross-sectional view of a light source unit in accordance with another embodiment of the present invention.

FIG. 9A is a cross-sectional view of a light source unit in accordance with another embodiment of the present invention.

The illustrated light source unit 4A includes the structure of the light source unit illustrated in FIG. 5, and additionally includes a third substrate 103 coupled to the first substrate 45 with a shield 44*c* being sandwiched therebetween, and a shield rear 33 fixed to the light-permeable substrate 100 and surrounding the first to third substrates 45, 46 and 103.

The first substrate 45, the third substrate 103 and the shield 44*c* define a closed space 105.

The shield 44*c* is formed with through-holes 104*a*. The shield rear 33 is formed with through-holes 104*b* in alignment with the through-holes 104*a*. Heat generated in the light source 4 is once accumulated in the closed space 105, and is radiated outwardly of the closed space 105 through the through-holes 104*a*, and then, radiated to an atmosphere through the through-hole 104*b*. Thus, heat generated in the discharge layer 47 can be efficiently radiated to an atmosphere.

Figure 9B:
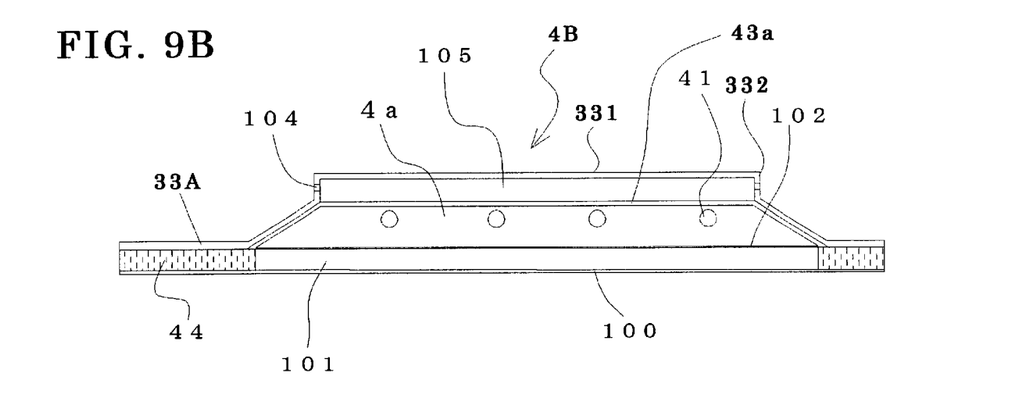
FIG. 9B is a cross-sectional view of a light source unit in accordance with still another embodiment of the present invention.

FIG. 9B illustrates a beneath-arrangement type light source unit in accordance with still another embodiment of the present invention.

The illustrated light source unit 4B has the same structure as the structure of the light source unit illustrated in FIG. 7A except the shield rear 33. That is, the light source unit 4B is designed to include a shield rear 33A in place of the shield rear 33 illustrated in FIG. 7A.

As illustrated in FIG. 9B, the shield rear 33A has a first portion 331 facing, but spaced away from the reflector 43a, and a side portion 332 extending between the first portion 331 and the reflector 43a. The first portion 331, the side portion 332 and the reflector 43a define a closed space 105.

The side portion 332 is formed with through-holes 104. Hence, the closed space 105 is in communication with an atmosphere through the through-holes 104. Heat generated in the light sources 41 are once accumulated in the closed space 105, and then, is exhausted to an atmosphere through the through-holes 104.

The beneath-arrangement type light source unit illustrated in FIG. 9B provides advantages that the closed space 105 acting as a heat-discharging layer can be defined with a smaller number of parts, and that the through-holes 104 can be formed in a smaller number of steps, because the through-holes 104 are formed only through the shield rear 33.

Figure 9C:
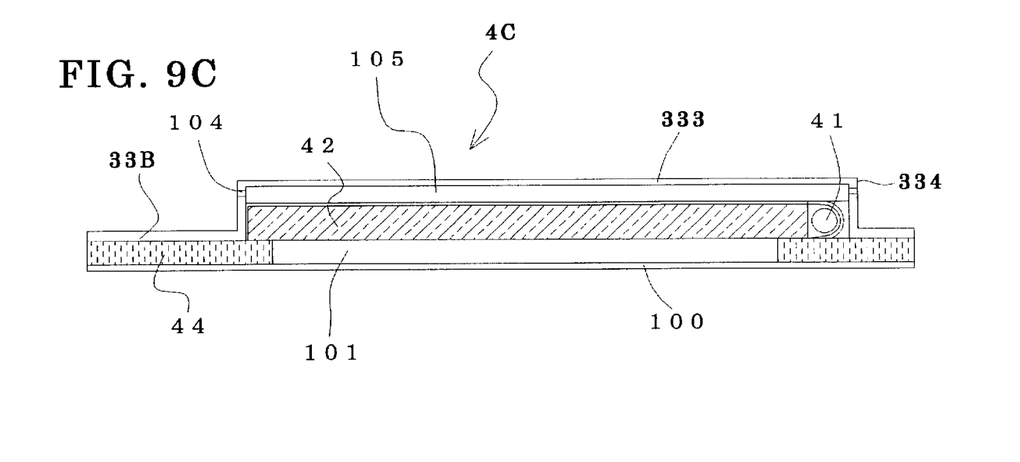
FIG. 9C is a cross-sectional view of a light source unit in accordance with yet another embodiment of the present invention.

FIG. 9C illustrates a side light type light source unit in accordance with still another embodiment of the present invention.

The illustrated light source unit 4C has the same structure as the structure of the light source unit illustrated in FIG. 7B except the shield rear 33. That is, the light source unit 4C is designed to include a shield rear 33B in place of the shield rear 33 illustrated in FIG. 7B.

As illustrated in FIG. 9C, the shield rear 33B has a first portion 333 facing, but spaced away from the light-guide plate 42, and a side portion 334 extending between the first portion 333 and the shield 44. The first portion 333, the side portion 334 and the light-guide plate 42 define a closed space 105.

The side portion 334 is formed with through-holes 104. Hence, the closed space 105 is in communication with an atmosphere through the through-holes 104. Heat generated in the light sources 41 are once accumulated in the closed space 105, and then, is exhausted to an atmosphere through the through-holes 104.

The side light type light source unit illustrated in FIG. 9C provides the same advantages as the advantages provided by the beneath-arrangement type light source illustrated in FIG. 9B.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-073039 filed on Mar. 15, 2000 including specification, claims, drawings and summary is incorporated herein by reference in its entirety.

What is claimed is:

1. A light source unit comprising:
   (a) a light source having a main surface through which a light emitted from said light source passes towards an object;
   (b) a light-permeable substrate located between said main surface of said light source and said object;
   (c) a first seal sandwiched between said main surface of said light source and a surface of said light-permeable substrate and defining a first closed space together with said main surface and aid surface of said light-permeable substrate, said first closed space being in vacuum; and
   (d) a heat radiator equipped with said light source for outwardly radiating heat generated in said light source, wherein said light source includes
      (a) a first substrate facing said light-permeable substrate;
      (b) a second substrate;
      (c) a third substrate;
      (d) a second seal sandwiched between said first and second substrates and defining a second closed space together with said first and second substrates, noble gas being sealed in said second closed space;
      (e) a third seal sandwiched between said second and third substrates and defining said closed space together with said second and third substrates, said third seal being formed with a first through-hole through which heat accumulated in said third closed space passes outwardly of said third closed space.

2. The light source unit as set forth in claim 1, further comprising a shield covering said light source therewith, said shield being formed with a second through-hole which is in communication with said first through-hole.

3. The light-source unit as set forth in claim 1, wherein said first closed space is kept in a pressure equal to or smaller than $1.3 \times 10^3$ Pa.

4. A light source unit comprising:
   (a) a light source having a main surface through which a light emitted from said light source passes towards and object;
   (b) a light-permeable substrate located between said main surface of said light source and said object;
   (c) a first seal sandwiched between said main surface of said light source and a surface of said light-permeable substrate and defining a first closed space together with said main surface and said surface of said light-permeable substrate, said first closed space being in a vacuum;
   (d) a heat radiator equipped with said light source for outwardly radiating heat generated in said light source; and
   (e) a dish-shaped shield in which said light source is set and which defines a closed space together with said light-permeable substrate.

5. The light source unit as set forth in claim 4, wherein said dish-shaped shield is formed with at least one through-hole through which heat generated in said light source is radiated.

6. A light source unit comprising:
   (a) a light source having a main surface through which a light emitted from said light source passes toward an object;
   (b) a light-permeable substrate located between said main surface of said light source and said object;
   (c) a first seal sandwiched between said main surface of said light source and a surface of said light-permeable substrate and defining a first closed space together with said main surface and said surface of said light-permeable substrate, said first closed space being a vacuum;
   (d) a heat radiator equipped with said light source for outwardly radiating heat generated in said light source;

(e) a shield; and
(f) a light-guide plate located in said shield, and having a first surface through which a light emitted from said light source pass, and a second surface of which said light source is positioned in the vicinity.

7. The light source unit as set forth in claim 6, wherein said shield is formed with at least one through-hole through which heat generated in said light source is radiated.

8. A light source unit comprising:
(a) a light source having a main surface through which a light emitted from said light source passes towards an object;
(b) a light-permeable substrate located between said main surface of said light source and said object;
(c) a first seal sandwiched between said main surface of said light source and s surface of said light-permeable substrate and defining a first closed space together with said main surface and said surface of said light-permeable substrate, said first closed space being in vacuum; and
(d) a heat radiator equipped with said light source for outwardly radiating heat generated in said light source,
wherein said light-permeable substrate has a function of diffusing a light emitted from said light source.

9. The light source unit as set forth in claim 8, wherein aid light source includes:
(a) a first substraight;
(b) a second substraight:
(c) a second seal sandwiched between said first and second substrates and defining a second closed space together with said first and second substrates,
noble gas being sealed in said second closed space.

10. A liquid crystal display unit comprising:
(a) a light source unit; and
(b) a liquid crystal display device receiving a light from said light source unit to display a designated image,
said light source unit including:
(a1) a light source having a main surface through which a light emitted from said light source passes towards an object;
(a2) a light-permeable substrate located between said main surface of said light source and said object;
(a3) a first seal sandwiched between said main surface of said light source and a surface of said light-permeable substrate and defining a first closed space together with said main surface and said surface of said light-permeable substrate, said first closed space being in vacuum; and
(a4) a heat radiator equipped with said light source for outwardly radiating heat generated in said light source,
wherein said light source includes
(a11) a first substrate facing said light-permeable substrate;
(a12) a second substrate;
(a13) a third substrate;
(a14) a second seal sandwiched between said first and second substrates and defining a second closed space together with said first and second substrates, noble gas being sealed in said second closed space; and
(a15) a third seal sandwiched between said second and third substrates and defining a third closed space together with said second and third substrates, said third seal being formed with a first through-hole through which heat accumulated in said third closed space passes outwardly of said third closed space.

11. The liquid crystal display unit as set forth in claim 10, wherein said third substrate is formed with at least one through-hole.

12. The liquid crystal display unit as set forth in claim 10, wherein said light source unit further includes a shield covering said light source therewith, said shield being formed with a second through-hole which is in communication with said first through-hole.

13. The liquid crystal display unit as set forth in claim 10, wherein said first closed space is kept in a pressure equal to or smaller than $1.33 \times^3$ Pa.

14. A liquid crystal display unit comprising:
(a) a light source unit; and
(b) a liquid crystal display device receiving a light from said light source unit to display a designated image,
said light source unit including:
(a1) a light source having a main surface through which a light emitted from said light source passes towards an object;
(a2) a light-permeable substrate located between said main surface of said light source and said object;
(a3) a first seal sandwiched between said main surface of said light source and a surface of said light-permeable substrate and defining a first closed space together with said main surface and said surface of said light-permeable substrate, said first closed space being in vacuum; and
(a4) a heat radiator equipped with said light source for outwardly radiating heat generated in said light source,
wherein said light source unit further includes a dish-shaped shield in which said light source is set and which defines a closed space together with said light-permeable substrate.

15. The liquid crystal display unit as set forth in claim 14, wherein said dish-shaped shield is formed with at least one through-hole through which heat generated in said light source is radiated.

16. A light crystal display unit comprising:
(a) a light source unit; and
(a) a liquid crystal display device receiving a light from said light source unit to display a designated imagine,
said light source including:
(a1) a light source having a main surface through which a light emitted from said light source passes towards and object;
(a2) a light-permeable substrate located between said main surface of said light source and said object;
(a3) a first seal sandwiched between said main surface of said light source and a surface of said light-permeable substrate and defining a first closed space together with said main surface and said surface of said light-permeable substrate, said first closed space being in vacuum; and
(a4) a heat radiator equipped with said light source for outwardly radiating heat generated in said light source,
wherein said light source unit further includes
a shield; and
a light-guide plate located in said shield, and having a first surface through which a light emitted from said light source passes, and a second surface on which said light source is positioned.

17. The liquid crystal display unit as set forth in claim 16, wherein said shield is formed with at least one through-hole through which heat generated in said light source is radiated.

18. The liquid crystal display unit as set forth in claim 16, wherein said light source includes:

(a11) a first substrate;

(a12) a second substrate;

(a13) a second seal sandwiched between said first and second substrates and defining a second closed space together with said first and second substrates, noble gas being sealed in said second closed space.

19. A liquid crystal display unit comprising:

(a) a light source unit; and (b) a liquid crystal display device receiving a light from said light source unit to display a designated image, said light source unit including:

(a1) a light source having a main surface through which a light emitted from said light source passes towards an object;

(a2) a light-permeable substrate located between said main surface of said light source and said object;

(a3) a first seal sandwiched between said main surface of said light source and a surface of said light-permeable substrate and defining a first closed space together with said main surface and said surface of said light-permeable substrate, said first closed space being a vacuum; and (a4) a heat radiator equipped with said light source for outwardly radiating heat generated in said light source, wherein said light-permeable substrate has a function of diffusing a light emitted from said light source.

* * * * *